(12) United States Patent
Kee et al.

(10) Patent No.: US 8,872,992 B2
(45) Date of Patent: Oct. 28, 2014

(54) OPTICAL ASSEMBLY, BACKLIGHT UNIT INCLUDING THE SAME, AND DISPLAY APPARATUS INCLUDING THE BACKLIGHT UNIT

(75) Inventors: Won Do Kee, Pyeongtaek-si (KR); Seung Se Kim, Pyeongtaek-si (KR); Sung Young Park, Pyeongtaek-si (KR)

(73) Assignee: LG Innotek Co., Ltd., Seoul (KR)

( * ) Notice: Subject to any disclaimer, the term of this patent is extended or adjusted under 35 U.S.C. 154(b) by 806 days.

(21) Appl. No.: 12/728,031

(22) Filed: Mar. 19, 2010

(65) Prior Publication Data

US 2010/0321421 A1 Dec. 23, 2010

Related U.S. Application Data

(60) Provisional application No. 61/219,480, filed on Jun. 23, 2009.

(30) Foreign Application Priority Data

Jul. 6, 2009 (KR) ........................ 10-2009-0061219

(51) Int. Cl.
| | |
|---|---|
| G02F 1/1333 | (2006.01) |
| G02F 1/1335 | (2006.01) |
| F21V 7/04 | (2006.01) |
| F21V 8/00 | (2006.01) |
| G09G 3/34 | (2006.01) |

(52) U.S. Cl.
CPC ............ *G09G 3/3426* (2013.01); *G02B 6/0091* (2013.01); *G02F 2201/503* (2013.01); *G02F 2001/133601* (2013.01); *G02F 1/133608* (2013.01); *G02B 6/0068* (2013.01); *G02F 1/133615* (2013.01); *G02F 1/133611* (2013.01); *G09G 2320/0233* (2013.01); *G02F 2001/133612* (2013.01); *G02F 2201/46* (2013.01); *G02B 6/0073* (2013.01); *G02F 2001/133628* (2013.01); *G02F 2001/133317* (2013.01); *G02B 6/008* (2013.01); *G09G 2330/045* (2013.01); *G09G 2300/0426* (2013.01); *G02F 1/133603* (2013.01)
USPC ................ 349/58; 349/61; 349/62; 362/612; 362/632; 362/633; 362/634

(58) Field of Classification Search
CPC .................... G02F 1/133603; G02F 1/133608; G02B 6/0068; G02B 6/0073
USPC ........... 349/58, 61–62, 65; 362/612, 632–634
See application file for complete search history.

(56) References Cited

U.S. PATENT DOCUMENTS

| 5,704,703 | A | 1/1998 | Yamada et al. .................. 362/27 |
| 5,717,422 | A | 2/1998 | Fergason ....................... 345/102 |

(Continued)

FOREIGN PATENT DOCUMENTS

| EP | 0 987 490 B1 | 3/2000 |
| JP | 64-29708 U | 2/1989 |

(Continued)

OTHER PUBLICATIONS

PCT International Search Report dated Oct. 27, 2010 issued in Application No. PCT/KR2010/001492.

(Continued)

*Primary Examiner* — Nathanael R Briggs
(74) *Attorney, Agent, or Firm* — Ked & Associates, LLP

(57) ABSTRACT

An optical assembly includes a plurality of light sources emitting light in a first direction at a predetermined orientation angle, and a light guide panel having a light incident section and a light emitting section. The light incident section has a first surface to receive the light emitted from the light sources in the first direction and the light emitting section is to emit light received from the light incident section in a second direction. Also included is at least one cover having a first surface adjacent the light sources and a second surface adjacent at least one portion of the light emitting section.

23 Claims, 13 Drawing Sheets

(56) References Cited

U.S. PATENT DOCUMENTS

| | | | |
|---|---|---|---|
| 6,011,602 A | 1/2000 | Miyashita et al. | 349/65 |
| 6,241,358 B1 | 6/2001 | Higuchi et al. | 362/31 |
| 6,456,343 B2 | 9/2002 | Kim et al. | 349/58 |
| 6,816,141 B1 | 11/2004 | Fergason | 345/88 |
| 7,125,152 B2 | 10/2006 | Lin et al. | 362/609 |
| 7,311,431 B2 | 12/2007 | Chew et al. | 362/613 |
| 7,312,838 B2 | 12/2007 | Hwang et al. | 349/58 |
| 7,413,330 B2 | 8/2008 | Furukawa | 362/600 |
| 7,641,375 B2 | 1/2010 | Fujita et al. | 362/617 |
| 7,855,391 B2 | 12/2010 | Park et al. | 257/98 |
| 8,071,997 B2 | 12/2011 | Scotch et al. | 257/99 |
| 8,113,704 B2 | 2/2012 | Bae et al. | 362/613 |
| 8,192,056 B2 | 6/2012 | Villard | 362/294 |
| 2001/0017774 A1 | 8/2001 | Ito et al. | 362/31 |
| 2003/0206253 A1* | 11/2003 | Cho | 349/61 |
| 2003/0231483 A1 | 12/2003 | Higashiyama | 362/31 |
| 2004/0130885 A1 | 7/2004 | Nakano | 362/31 |
| 2005/0248939 A1 | 11/2005 | Li et al. | 362/225 |
| 2005/0276075 A1 | 12/2005 | Chen et al. | 362/615 |
| 2006/0044830 A1 | 3/2006 | Inoue et al. | 362/614 |
| 2006/0114690 A1 | 6/2006 | Iki et al. | 362/612 |
| 2006/0209564 A1 | 9/2006 | Lin et al. | 362/609 |
| 2006/0221638 A1* | 10/2006 | Chew et al. | 362/613 |
| 2006/0239033 A1 | 10/2006 | Jung et al. | 362/612 |
| 2006/0245213 A1 | 11/2006 | Beil et al. | 362/616 |
| 2007/0019419 A1 | 1/2007 | Hafuka et al. | 362/373 |
| 2007/0058390 A1 | 3/2007 | Sugawara et al. | 356/560 |
| 2007/0076434 A1 | 4/2007 | Uehara et al. | 362/616 |
| 2007/0247869 A1 | 10/2007 | Lang et al. | 362/612 |
| 2007/0247871 A1 | 10/2007 | Yoo | 362/612 |
| 2008/0043171 A1 | 2/2008 | Takahashi et al. | 349/65 |
| 2008/0205080 A1 | 8/2008 | Erchak et al. | 362/613 |
| 2009/0190072 A1 | 7/2009 | Nagata et al. | 349/96 |
| 2009/0303430 A1 | 12/2009 | Murata et al. | 349/58 |
| 2010/0046201 A1 | 2/2010 | Wang et al. | 362/97.1 |
| 2010/0149836 A1 | 6/2010 | Hung et al. | 362/634 |
| 2011/0051045 A1 | 3/2011 | Hur et al. | 349/65 |

FOREIGN PATENT DOCUMENTS

| | | |
|---|---|---|
| JP | 01-261692 A | 10/1989 |
| JP | 08-160425 A | 6/1996 |
| JP | 09-171111 A | 6/1997 |
| JP | 09-186825 A | 7/1997 |
| JP | 09-292531 A | 11/1997 |
| JP | 11-288611 A | 10/1999 |
| JP | 2002-228844 A | 8/2002 |
| JP | 2004-206916 A | 7/2004 |
| JP | 2005-259361 A | 9/2005 |
| JP | 2005-317480 A | 11/2005 |
| JP | 2006-054410 A | 2/2006 |
| JP | 2006-108033 A | 4/2006 |
| JP | 2006-134748 A | 5/2006 |
| JP | 2006-269364 A | 10/2006 |
| JP | 2006-286638 A | 10/2006 |
| JP | 2007-250197 A | 9/2007 |
| JP | 2007-250979 A | 9/2007 |
| JP | 2007-265837 A | 10/2007 |
| JP | 2007-293339 A | 11/2007 |
| JP | 2008-108622 A | 5/2008 |
| JP | 2008-108623 A | 5/2008 |
| JP | 2008-192395 A | 8/2008 |
| JP | 2009-054990 A | 3/2009 |
| KR | 10-2001-0012532 A | 2/2001 |
| KR | 10-2001-0085460 A | 9/2001 |
| KR | 10-2003-016631 A | 3/2003 |
| KR | 10-2005-0067858 A | 7/2005 |
| KR | 10-2005-0067903 A | 7/2005 |
| KR | 10-2005-0112661 A | 12/2005 |
| KR | 10-2006-0106774 A | 10/2006 |
| KR | 10-2007-0001657 A | 1/2007 |
| KR | 10-2007-0002920 A | 1/2007 |
| KR | 10-2007-0029365 A | 3/2007 |
| KR | 10-2007-0104149 A | 10/2007 |
| KR | 10-2008-0070214 A | 7/2008 |
| KR | 10-2008-0078210 A | 8/2008 |
| KR | 10-2009-0022350 A | 3/2009 |
| KR | 10-2009-0040673 A | 4/2009 |
| KR | 10-2009-0109766 A | 10/2009 |
| WO | WO 2009/017067 A1 | 2/2009 |
| WO | WO 2010/038516 A1 | 4/2010 |

OTHER PUBLICATIONS

PCT International Search Report dated Oct. 29, 2010 issued in Application No. PCT/KR2010/001485.
Korean Office Action dated Dec. 21, 2010 issued in Application No. 10-2008-0049146.
Korean Office Action dated Dec. 21, 2010 issued in Application No. 10-2008-0099569.
European Search Report dated Apr. 26, 2011 issued in Application No. 10 01 5492.
Korean Notice of Allowance dated Nov. 30, 2011 issued in Application No. 10-2008-0049146 (with English translation).
U.S. Office Action dated Feb. 1, 2012 issued in U.S. Appl. No. 12/632,694.
Final Office Action dated Feb. 17, 2011 issued in U.S. Appl. No. 12/618,603.
PCT International Search Report and Written Opinion dated Jan. 8, 2010 issued in Application No. PCT/KR2009/002782.
Korean Office Action dated Feb. 22, 2010 issued in Application No. 10-2008-0061487.
U.S. Office Action dated May 25, 2011 issued in U.S. Appl. No. 12/453,885.
U.S. Office Action dated Sep. 7, 2010 issued in U.S. Appl. No. 12/618,603.
Korean Notice of Allowance dated Aug. 30, 2011 issued in Application No. 10-2008-0049146 (English translation).
European Search Report dated Aug. 30, 2011 issued in Application No. 09 75 5013.
U.S. Office Action dated Oct. 25, 2011 issued in U.S. Appl. No. 12/727,966.
Korean Office Action dated Apr. 9, 2010 issued in Application No. 10-2009-0113708.
Korean Office Action dated Oct. 11, 2010 issued in Application No. 10-2009-0053260.
International Search Report dated Oct. 27, 2010 issued in Application No. PCT/KR2010/001963.
United States Final Office Action dated Nov. 3, 2011 issued in U.S. Appl. No. 12/453,885.
PCT International Search Report dated Sep. 30, 2010 issued in Application No. PCT/KR2010/001067.
PCT International Search Report dated Sep. 30, 2010 issued in Application No. PCT/KR2010/001420.
PCT International Search Report and Written Opinion dated Jun. 23, 2010 issued in Application No. PCT/KR2009/005992.
PCT International Search Report dated Oct. 28, 2010 issued in Application No. PCT/KR2010/001422.
PCT International Search Report dated Oct. 28, 2010 issued in Application No. PCT/KR2010/001423.
PCT International Search Report dated Oct. 28, 2010 issued in Application No. PCT/KR2010/001424.
PCT International Search Report dated Oct. 28, 2010 issued in Application No. PCT/KR2010/001425.
United States Notice of Allowance dated Apr. 4, 2012 issued in U.S. Appl. No. 12/768,982.
United States Office Action dated Jun. 13, 2012 issued in U.S. Appl. No. 12/728,065.
United States Notice of Allowance dated Jul. 12, 2012 issued in U.S. Appl. No. 12/728,001.
United States Office Action dated Sep. 6, 2012 issued in U.S. Appl. No. 12/728,087.
United States Office Action dated Sep. 26, 2012 issued in U.S. Appl. No. 12/728,111.
United States Office Action dated Sep. 27, 2012 issued in U.S. Appl. No. 12/728,131.
United States Office Action dated Jun. 12, 2013 issued in U.S. Appl. No. 12/728,131.

* cited by examiner

OPTICAL ASSEMBLY, BACKLIGHT UNIT INCLUDING THE SAME, AND DISPLAY APPARATUS INCLUDING THE BACKLIGHT UNIT

CROSS-REFERENCE TO RELATED APPLICATIONS

The present application claims priority under 35 U.S.C. §119 and 35 U.S.C. §365 to U.S. Provisional Patent Application Ser. No. 61/219,480 filed on Jun. 23, 2009 and Patent Korean Patent Application No. 10-2009-0061219, filed on Jul. 6, 2009, the contents of which are hereby incorporated by reference in their entirety.

BACKGROUND

1. Field

One or more embodiments described herein relate to an optical assembly.

2. Background

A light emitting diode (LED), containing semiconductor material such as GaAs-based compounds, AlGaAs-based compounds, GaN-based compounds, InGaN-based compounds, and InGaAlP-based compounds, may constitute a light emitting source.

Such an LED is packaged to be applied to a light emitting device emitting light having various colors. Light emitting devices employing LEDs are used as light sources of various displays such as lighting displays emitting colored light, character displays, and image displays.

DETAILED DESCRIPTION

Figure 1:
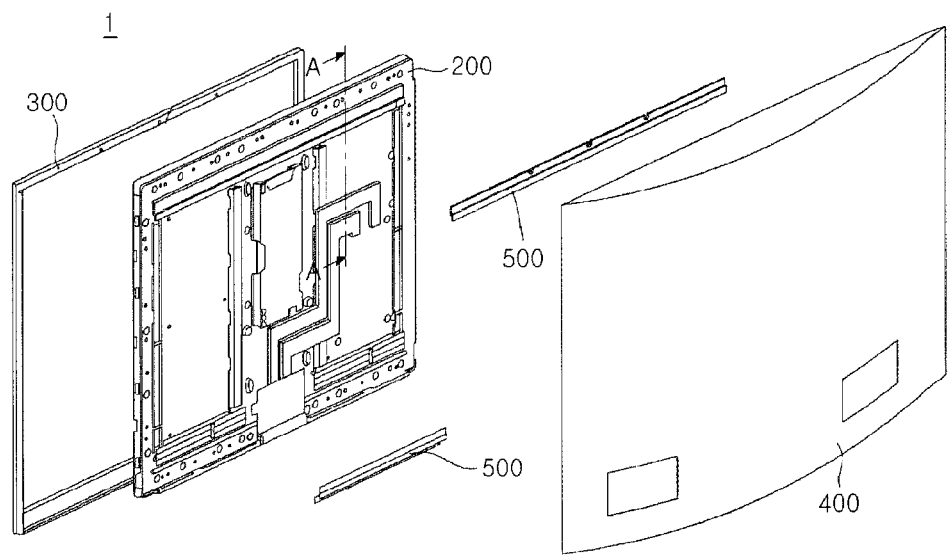
FIG. 1 is a diagram showing one embodiment of a display apparatus.

FIG. 1 is an exploded perspective view illustrating a display apparatus 1 according to an embodiment. Referring to FIG. 1, the display apparatus 1 includes a display module 200, a front cover 300 and a back cover 400 that surround the display module 200, and a fixing member 500 for fixing the display module 200 to at least one of the front cover 300 and the back cover 400.

A portion of the fixing member 500 is fixed to the front cover 300 through a coupling member such as a screw, and then, another portion of the fixing member 500 supports the display module 200 with respect to the front cover 300, so that the display module 200 can be fixed with respect to the front cover 300.

Although the fixing member 500 has an elongated plate shape in the current embodiment, the display module 200 may be fixed to the front cover 300 or the back cover 400 through a coupling member without the fixing member 500.

Figure 2:
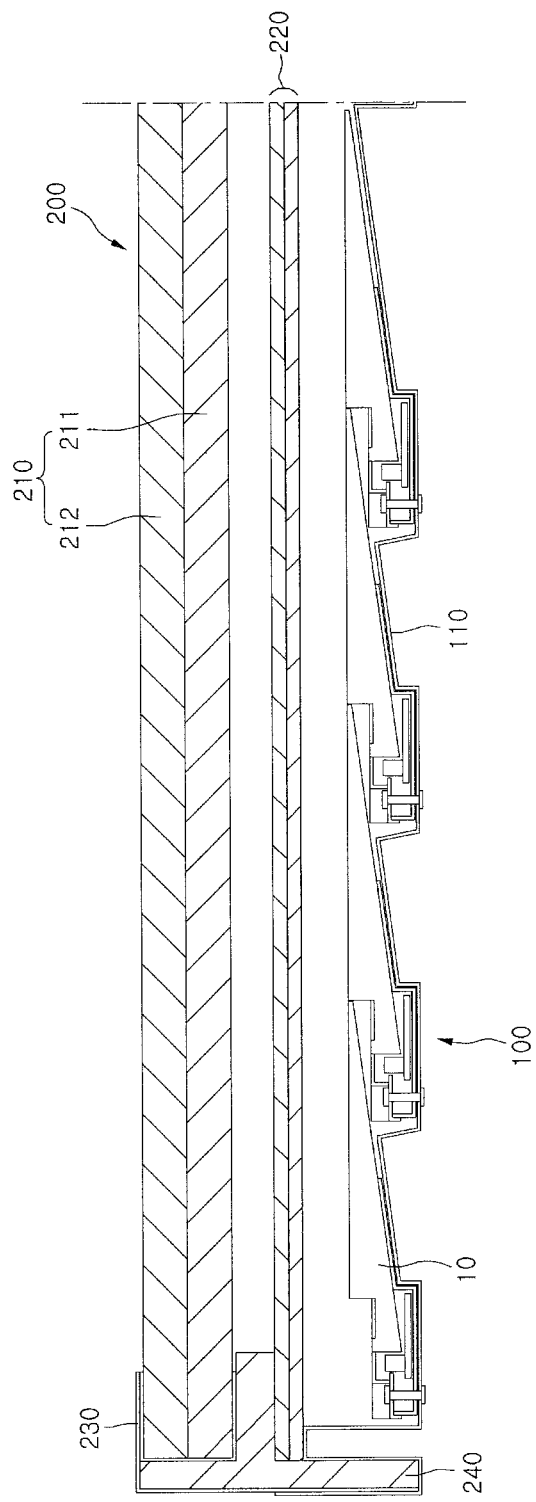
FIG. 2 is a diagram showing a cross-sectional view taken along line A-A of FIG. 1.

FIG. 2 is a cross-sectional view taken along line A-A of FIG. 1.

Referring to FIG. 2, the display module 200 includes a display panel 210 for displaying an image, a backlight unit 100 emitting light to the display panel 210, a bottom cover 110 providing the lower appearance of the display module 200, a panel supporter 240 supporting the display panel 210 from the lower side, a top cover 230 supporting the display panel 210 from the upper side and constituting a border of the display module 200.

The bottom cover 110 may have a box shape with an open upper surface to receive the backlight unit 100.

A side of the bottom cover 110 may be fixed to a side of the top cover 230. For example, a coupling member such as a screw may pass through a side surface of the display module 200, that is, through a side where the bottom cover 110 overlaps the top cover 230 to fix the bottom cover 110 and the top cover 230.

A rear surface of the bottom cover 110 is provided with at least one substrate (not shown) to drive the display module 200 with a signal transmitted from the outside, e.g. an image signal.

The substrate may be, e.g., a driving part of an image display and/or a backlight unit such as a timing controller, a T-con board, or a main printed circuit board (PCB), and fixed to the rear surface of the bottom cover 110 through an adhesive member or a coupling member such as a screw.

For example, the display panel 210 may include a lower substrate 211 and an upper substrate 212 attached to each other with a constant cell gap, and a liquid crystal layer interposed between the lower substrate 211 and the upper substrate 212. The lower substrate 211 is provided with a plurality of gate lines and a plurality of data lines crossing the gate lines. Thin film transistors (TFTs) may be disposed in crossing areas of the gate lines and the data lines. The upper substrate 212 may be provided with color filters, but the structure of the display panel 210 is not limited thereto. For example, the lower substrate 211 may include color filters as well as TFTs. In addition, the structure of the display panel 210 may be varied according to a method of driving the liquid crystal layer.

Although not shown, an edge of the display panel 210 may be provided with a gate driving printed circuit board (PCB)

supplying scan signals to the gate lines, and a data driving PCB supplying data signals to the data lines.

One of the upper and lower sides of the display panel 210 may be provided with a polarized light filter (not shown).

An optical sheet 220 may be disposed between the display panel 210 and the backlight unit 100, or the optical sheet 220 may be removed, and thus the present disclosure is not limited thereto.

The optical sheet 220 may include at least one of a spread sheet (not shown) and a prism sheet (not shown).

The spread sheet uniformly spreads light emitted from a light guide panel, and the spread light may be collected to the display panel 210 through the prism sheet. The prism sheet including one or more illumination enhancement films and at least one of a horizontal prism sheet and a vertical prism sheet may be selectively provided. The types and number of optical sheets may be varied within the scope of the present disclosure.

The backlight unit 100 includes a plurality of optical assemblies 10 constituting a plurality of division driving areas. The display panel 210 includes a plurality of division areas respectively corresponding to the optical assemblies 10 that may adjust the brightness of the display panel 210 according to a gray level peak value or a color coordinate signal of the division area. Hereinafter, the configuration of the backlight unit 100 will now be described in detail.

Figure 3:
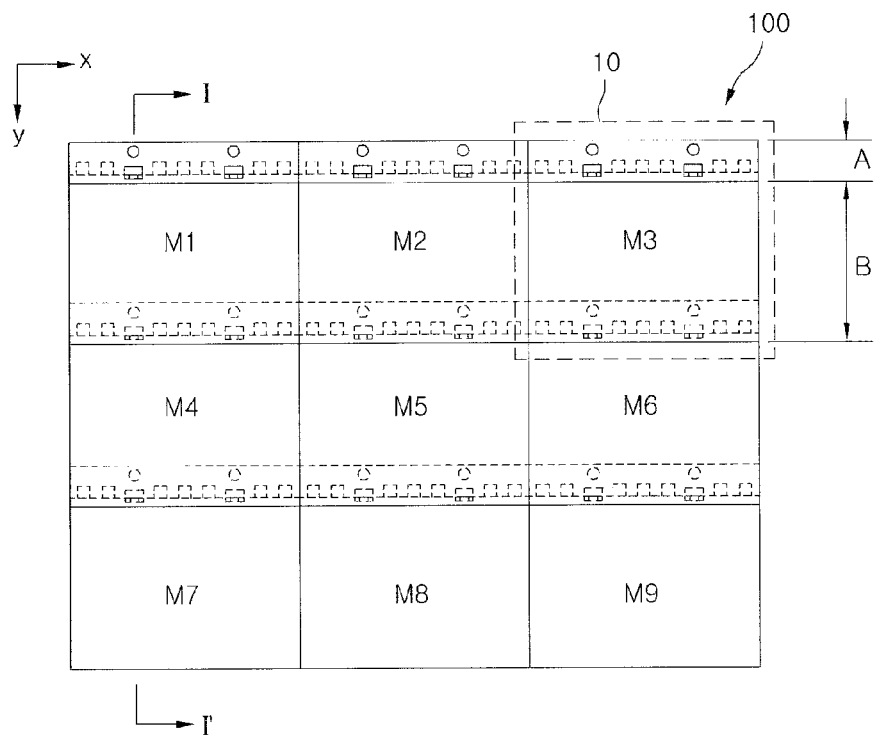
FIG. 3 is a diagram showing one embodiment of a backlight unit.

FIG. 3 is a plan view illustrating the backlight unit 100. Referring to FIG. 3, the optical assemblies 10 of the backlight unit 100 may be arrayed in an N×M matrix (N is the number of rows arrayed along a y-axis direction, M is the number of columns arrayed along an x-axis direction, and M and N are natural numbers equal to 2 or greater).

The optical assemblies 10 may overlap each other at a predetermined area.

The optical assemblies 10 each may define a first area A and a second area B as illustrated in FIG. 3. The first area A may be provided with light sources 13, a first part 15b, and a side cover 20 (refer to FIG. 4). The second area B receives light emitted from the first area A and emits the light forward. The first area A may be disposed under the second area B of the adjacent optical assembly 10.

The optical assemblies 10 may overlap each other to hide the first areas A as illustrated in FIG. 3. However, the first areas A of the optical assemblies 10 disposed at an edge of the backlight unit 100 may be exposed without overlapping, as illustrated in FIG. 3. The second areas B may be close to each other at front/rear boundaries and left/right boundaries.

Each of the optical assemblies 10 is driven in an edge-type backlight manner and operates as a single light source. In this state, the optical assemblies 10 are arrayed in a direct-type backlight manner to constitute the backlight unit 100. Thus, the case that light emitting diodes (LEDs) are detected as a hot spot on a screen can be prevented, and the thickness of the light guide panel 15 and the number of optical films can be reduced to achieve the slimness of the backlight unit 100.

For example, the backlight unit 100 of FIG. 3 may include the nine optical assemblies 10 (M1 to M9) in a 3×3 matrix.

Each of the optical assemblies 10 may be manufactured as a discrete assembly, and the optical assemblies 10 may be adjacent to each other to constitute a module-type backlight unit that is a backlight member configured to provide light to the display panel 210.

The backlight unit 100 may be driven using an entire driving method or a local driving method such as a local dimming method and an impulsive method. LEDs 11 (refer to FIG. 4) function as light sources emitting light. The method of driving the LEDs 11 may be varied according to a circuit design, and thus is not limited. According to the embodiment, a color contrast ratio is increased, and a bright region and a dark region can be sharply expressed on a screen, thereby improving image quality.

That is, the backlight unit 100 is operated by a plurality of division driving areas, and the brightness of the division driving area is linked with brightness corresponding to an image signal. Thus, the brightness in a dark portion of an image is decreased, and the brightness in a bright portion of the image is increased, so as to improve a contrast ratio and sharpness of the image.

When the backlight unit 100 is driven using the local dimming method, the display panel 210 includes the division areas corresponding to the optical assemblies 10. The brightness of the display panel 210 may adjusted in an optical assembly unit according to gray level peak values or color coordinate signals of the division areas.

For example, only the optical assembly 10 (M5) may be driven independently to emit light.

The backlight unit 100 according to the current embodiment uses the local driving method to reduce power consumption, thus achieving cost reduction.

In addition, a process of assembling the optical assemblies 10 to manufacture the backlight unit 100 is simple, and losses generated during the assembling process are minimized, thus improving productivity. Furthermore, light guide panel 15 can be prevented from being scratched while the backlight unit 100 is assembled and optical damage can be prevented, thereby improving process reliability and the quality of the backlight unit 100.

In addition, the optical assemblies 10 are standardized to be adapted for mass production and applied to backlight units having various sizes.

In addition, when one of the optical assemblies 10 is damaged, only the damaged optical assembly 10 can be replaced without replacing the backlight unit 100. Thus, a replacing process is convenient, and a replacing cost is reduced.

In addition, the optical assemblies 10 and the backlight unit 100 including the optical assemblies 10 are resistant to external shock or environmental changes and have high durability.

In addition, since the adjacent optical assemblies 10 overlap each other, a bright line or a dark line generated at the boundary of the optical assemblies 10 is prevented to improve the uniformity of light.

In addition, the backlight unit 100 can be easily applied to a large display panel, and the slimness of the backlight unit 100 and the display panel 210 can be achieved.

Figure 4:
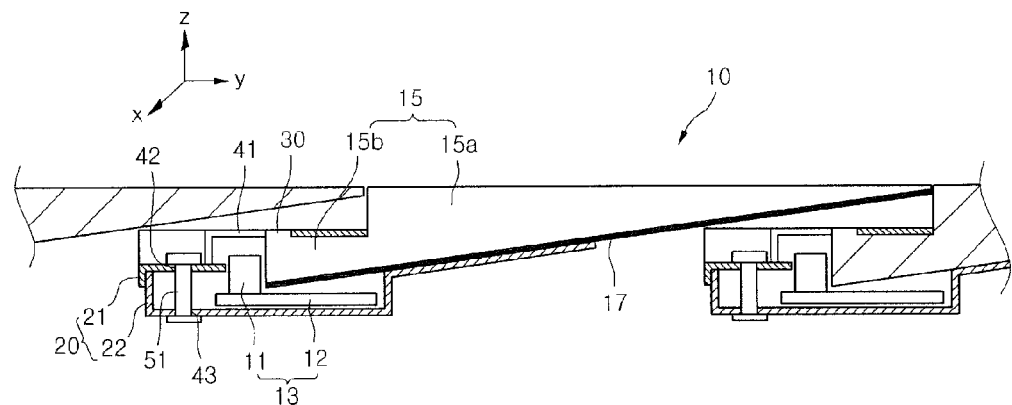
FIG. 4 is a diagram showing a cross-sectional view taken along line I-I' of FIG. 3.
Figure 5:
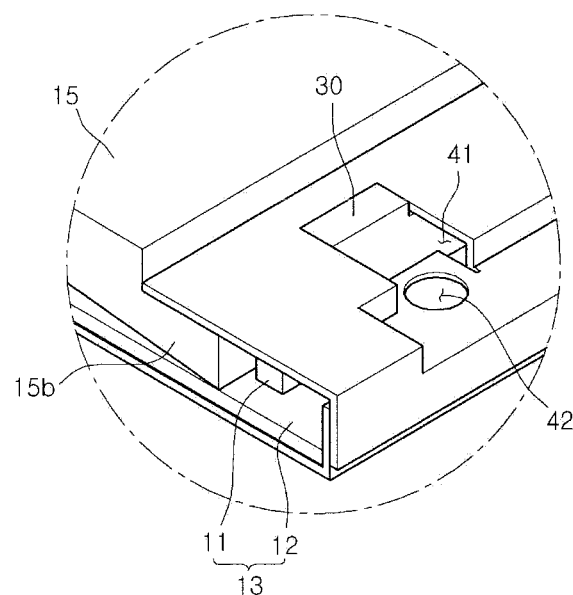
FIG. 5 is a diagram showing a perspective view of the backlight unit of FIG. 4.
Figure 6:
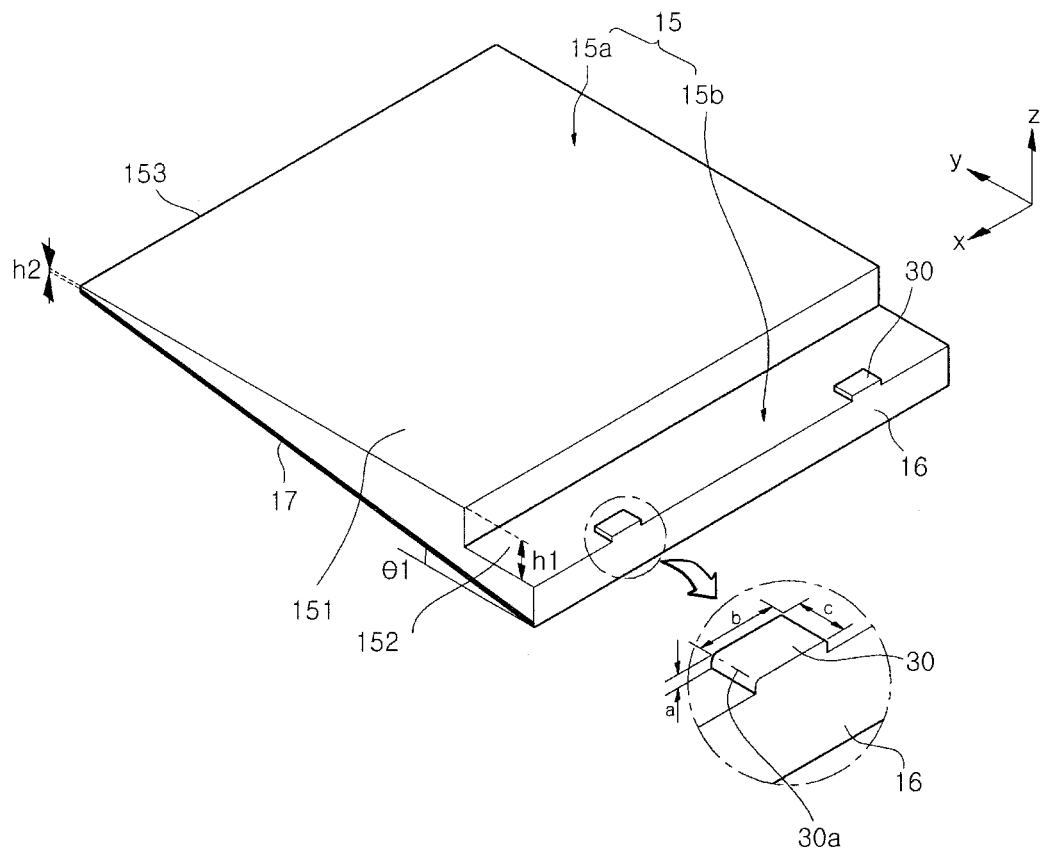
FIGS. 6 to 8 are diagrams showing perspective views of one embodiment of an optical assembly.
Figure 7:
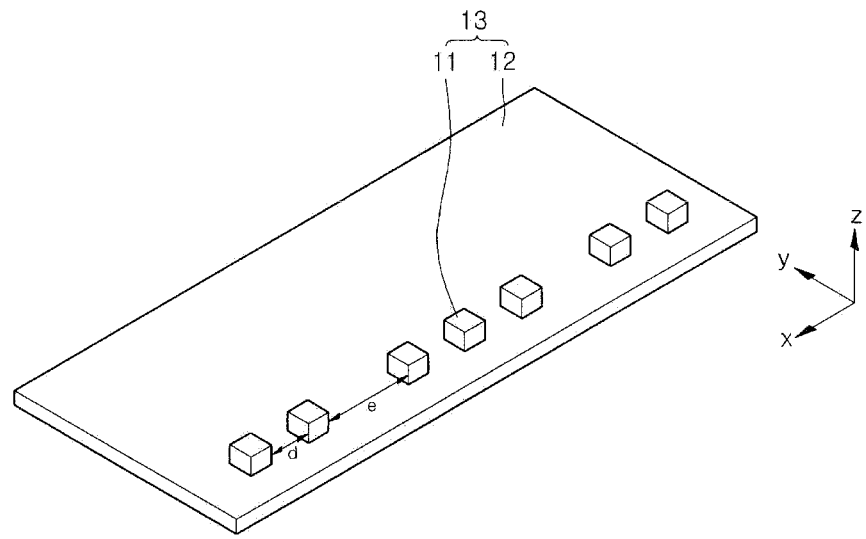
Figure 8:
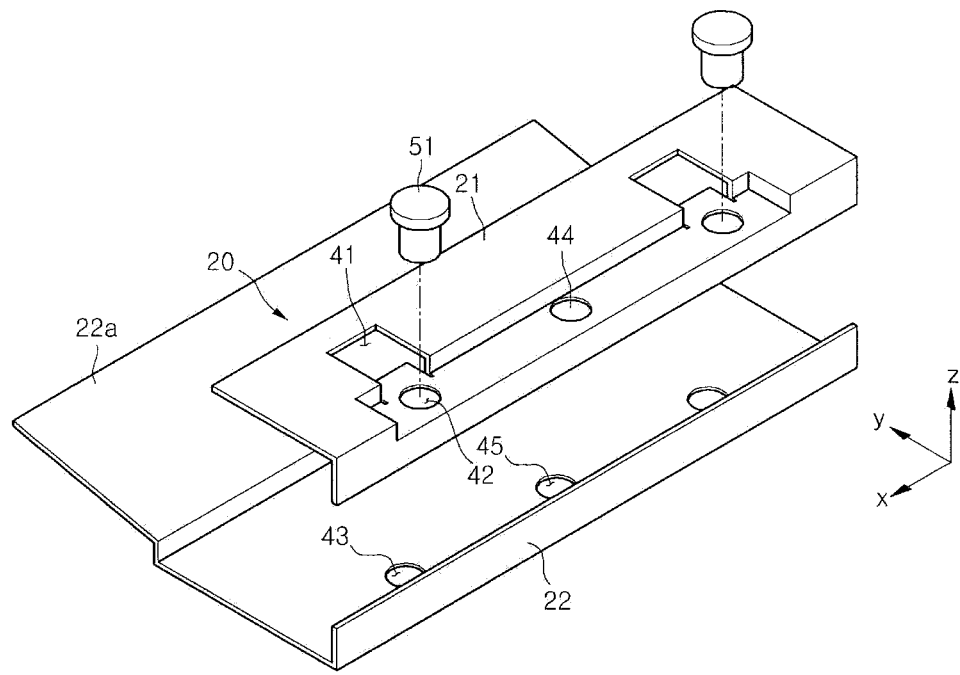

FIG. 4 is a cross-sectional view taken along line I-I' of FIG. 3. FIG. 5 is a perspective view illustrating the backlight unit 100 on the basis of FIG. 4. FIGS. 6 to 8 are perspective views illustrating components of the optical assembly 10.

Referring to FIGS. 4 to 6, the optical assembly 10 may include the light source 13, the light guide panel 15, a reflecting member 17, and the side cover 20 for fixing the light source 13 and the light guide panel 15. The side cover 20 provides a fixing position with respect to the bottom cover 110 and may include a first side cover 21 and a second side cover 22.

The light guide panel 15 spreads light of the light sources 13 incident in a first direction (in the y-axis direction) and emits the light in a second direction (in an upward direction).

Each of the light guide panels 15 may include the first part 15b and a second part 15a. The second part 15a, which is also referred to as a light emitting part, may include an upper surface generating a surface light source, a lower surface facing the upper surface, and four side surfaces.

The first part 15*b* may horizontally protrude from one of the side surfaces of the second part 15*a* along the lower portion of the side surface. The first part 15*b* may be a light incident part receiving light from the light source 13. The side surface of the second part 15*a* facing the first part 15*b* may be referred to as a light facing portion. The plane of the light guide panel 15, substantially providing light to the display panel 210, may be referred to as a light emitting portion.

A first side of the first part 15*b* is provided with a light incident surface 16 receiving light. A first side of the second part 15*a* is connected to a second side of the first part 15*b*.

A stair part, having a height h1, is disposed between an upper surface 152 of the first part 15*b* and an upper surface 151 of the second part 15*a*. At least one portion of the upper surface 152 of the first part 15*b* is surrounded by at least one portion of the side cover 20.

The upper or lower surface of the light guide panel 15 may be provided with a diffusion pattern (not shown) that has a predetermined pattern to diffuse and reflect incident light, thus improving the uniformity of light at the front surface of the light guide panel 15.

Since the lower surface of the light guide panel 15 is inclined at a predetermined angle from the first part 15*b* to the light facing portion, the light guide panel 15 may gradually decrease in thickness from the first part 15*b* to the light facing portion.

A height h2 of a second end 153 of the second part 15*a* is less than or equal to the height h1. When the height h2 of the second end 153 is greater than the height h1 of the stair part, the inclination angle of the lower surface of the light guide panel 15 is decreased. Thus, the reflectance of the light guide panel 15 is decreased, and the efficiency of light emitted upward from the second part 15*a* is decreased. In addition, light interference occurs in which light that does not pass through the upper surface 151 is leaked into the adjacent light guide panel 15 through the second end 153. Thus, the height h2 of the second end 153 of the second part 15*a* is less than or equal to the height h1 of the stair part.

The lower surface of the light guide panel 15 may be referred to as a rear surface, and the upper surfaces 151 and 152 may be referred to as front surfaces.

The lower surface of the light guide panel 15 may be provided with the reflecting member 17 that reflects light, laterally incident through the first part 15*b* and guided in the light guide panel 15, to the upper side.

In addition, the reflecting member 17 may prevent interference of light generated between the overlapped optical assemblies 10.

As described above, the number of rows of the light guide panels 15 arrayed along the y-axis direction is N (N is 2 or greater). The second end 153 of the second part 15*a* of the light guide panel 15 in a $K^{th}$ row (K is one of 1 to N−1) of the N rows is disposed above the first part 15*b* of the light guide panel 15 in a $K+1^{th}$ row, so that the two adjacent light guide panels 15 can overlap each other in at least one portion.

The first part 15*b* may protrude along the lower portion of one side surface of the light guide panel 15.

The first part 15*b* includes a protrusion 30 protruding with a predetermined height 'a' from the upper surface of the first part 15*b*.

The protrusion 30 may be provided to at least two points in the x-axis direction at the upper surface of the first part 15*b*.

The shape of the protrusion 30 may be varied. For example, the protrusion 30 may have a rectangular parallelepiped shape. The protrusions 30 are caught by the first side cover 21 to prevent the shaking of the light guide panel 15 along the x-axis and the y-axis.

An edge 30*a* of the protrusion 30 may be rounded to prevent a case that a crack is formed at the protrusion 30 by shock due to the movement of the light guide panel 15.

The height 'a' of the protrusion 30 may range from about 0.3 to 0.6 mm from the upper surface of the first part 15*b*. The protrusion 30 may have a width 'b' ranging from about 2 to 5 mm along the x-axis. The protrusion 30 may have a width 'c' ranging from about 1 to 3 mm along the y-axis.

The protrusion 30 may be disposed between the neighboring LEDs 11 and adjacent to the light incident surface 16 on the upper surface of the first part 15*b*, so as to prevent optical interference of light emitted from the LEDs 11 due to the protrusion 30 integrally formed with the light guide panel 15.

Relative positions between the LEDs 11 and the protrusions 30 disposed on the upper surface of the first part 15*b* of the light guide panel 15, and the size of the protrusion 30 are not limited thereto. Thus, the relative positions can be varied according to an optical design, components, and a product group.

The light guide panel 15 may be transparent. For example, the light guide panel 15 may be formed of one of acryl-based resin such as polymethyl metaacrylate (PMMA), polyethylene terephthlate (PET), poly carbonate (PC), and polyethylene naphthalate (PEN). The light guide panel 15 may be formed using an extrusion molding method.

Referring to FIGS. 4 and 7, the light source 13 may include at least one of the LEDs 11, and a module substrate 12 to which the LED 11 is mounted.

The LEDs 11 may be arrayed along the x-axis on the module substrate 12 and adjacent to the light incident surface 16 of the first part 15*b*.

At least one portion of the light guide panel 15, that is, at least one portion of the first part 15*b* may be placed on and supported by at least one portion of the module substrate 12.

The module substrate 12 may include one of a flexible substrate and a printed circuit board (PCB) such as a metal core PCB and a FR-4 PCB, but is not limited thereto.

A thermal pad may be disposed under the module substrate 12 between the module substrate 12 and the second side cover 22.

The LED 11 may be a side illumination-type LED, and be a color LED emitting at least one of red, blue, and green light, or a white LED. The color LED may include at least one of a red LED, a blue LED, and a green LED, and the arrangement and light type of the LEDs 11 may be varied within the scope of the present disclosure.

Light emitted from the LED 11 is laterally incident to the first part 15*b*. Colors of light incident from the LEDs 11 may be mixed in the light guide panel 15 including the first part 15*b*.

Light emitted from the LEDs 11 is guided in the first part 15*b* and incident to the second part 15*a*. The light incident to the second part 15*a* is reflected upward from the reflecting member 17 disposed on the lower surface of the second part 15*a*. At this point, the diffusion pattern disposed on the lower surface of the light guide panel 15 diffuses and spreads the light to improve the uniformity of the light.

The LEDs 11 may be disposed on the module substrate 12, and may emit light having a wavelength ranging from about 430 to 480 nm. A fluorescent material may be applied on a light emitting surface of the LED 11 to transmit light emitted from the LED 11.

The height of the LEDs 11 is equal to or less than that of the light incident surface 16. That is, when the height of the LEDs 11 is greater than that of the light incident surface 16, a portion of light emitted from the light emitting surfaces of the LEDs 11 may be leaked out without reaching the light incident surface 16. Since the LEDs 11 emit light with a predetermined orientation angle with respect to the first direction, the height of the light incident surface 16 is greater than that of the LEDs 11. However, when the height of the light incident surfaces 16 is greater than two times the height of the LEDs 11, light leakage efficiency and light efficiency are not increased any more. Rather, excessive spread reduces light efficiency.

Thus, according to the current embodiment, the height of the light incident surface 16 is equal to the height of the LEDs 11, or less than two times the height of the LEDs 11.

The LEDs 11 may be spaced a predetermined distance from each other on the module substrate 12. The LEDs 11 may be disposed in an oblique direction with respect to the protrusion 30 to minimize optical effect due to the protrusion 30 of the light guide panel 15. Accordingly, the distance between the LEDs 11 around the protrusion 30 may be greater than the distance between the other LEDs 11.

The distance between a portion of the LEDs 11 may be greater than the distance between the other LEDs 11 to secure a coupling space of the first side cover 21 and the second side cover 22 and minimize optical effect due to coupling force for pressing the light guide panel 15.

For example, when a first distance 'd' between the adjacent LEDs 11 is about 10 mm, a second distance 'e' of the LEDs 11 around the coupling space may be about 13 mm.

The colors of light emitted from the LEDs 11 are mixed in the light guide panel 15 including the first part 15b to uniformly provide the light to the second part 15a.

The module substrate 12 may be provided with first fixing holes (not shown) for fixing the module substrate 12 to the side cover 20. The side cover 20 may be provided with second fixing holes (not shown) corresponding to the first fixing holes. The module substrate 12 may be fixed to the side cover 20 through a coupling member (not shown) passing through the first and second fixing holes.

Referring to FIGS. 4 and 8, the side cover 20 surrounds the light source 13 and a portion of the light guide panel 15.

The side cover 20 may include the first side cover 21 disposed on the light source 13 and the first part 15b, and the second side cover 22 disposed under the first part 15a.

The side cover 20 may be formed of plastic or metal.

The first side cover 21 faces the upper surface of the first part 15b, and may be bent downward (along the z-axis) at the upper surface of the first part 15b to face the light incident surface 16.

The second side cover 22, facing the lower surface of the first part 15b, may be bent upward (along the z-axis) at the lower surface of the first part 15b to face the light incident surface 16. A portion 22a of the second side cover 22 may be inclined along the lower surface of the light guide panel 15, that is, along an inclined surface of the light guide panel 15. The second side cover 22 may accommodate the light source 13.

The first side cover 21 is coupled to the second side cover 22 through a first fixing member 51 to prevent the shaking of the light source 13 and the light guide panel 15 due to external shock, and particularly, prevent the shaking along the z-axis.

The second side cover 22 supports the inclined surface of the light guide panel 15 to firmly maintain alignment of the light guide panel 15 with the light source 13 and protect the light guide panel 15 and the light source 13 from external shock.

The first side cover 21 may have first holes 41 at positions corresponding to the protrusions 30 of the first part 15b.

The first holes 41 may be larger than the protrusions 30 such that the protrusions 30 are fitted and caught to the first holes 41. The protrusion 30 disposed in the first hole 41 partially has a predetermined gap that may be a margin for preventing the torsion of the light guide panel 15 when the light guide panel 15 is expanded by environmental change such as sharp temperature increase. In this case, the rest of the protrusion 30 without the predetermined gap may be in contact with the first side cover 21 to increase fixing force thereof.

At least one second hole 42 may be further disposed in the first side cover 21.

The second side cover 22 may have at least one third hole 43 at a position corresponding to the second hole 42.

The second and third holes 42 and 43 are disposed on a straight line in the z-axis direction such that the first fixing member 51 is inserted to firmly fix the first and second side covers 21 and 22. To secure fixing force for the first and second side covers 21 and 22, the optical assembly 10 may have at least two couples each including the second and third holes 42 and 43. The second and third holes 42 and 43 may be disposed at any position of the first and second side covers 21 and 22, respectively.

Although the second and third holes 42 and 43 are exemplified as through holes according to the current embodiment, the second and third holes 42 and 43 may be configured to receive at least one portion of a fixing member for fixing the first and second side covers 21 and 22. Thus, the second and third holes 42 and 43 may be referred to as first and second insertion parts such as holes or recesses.

The first and second side covers 21 and 22 may be referred to as upper and lower covers.

The second hole 42 and the first hole 41 may be disposed in the first side cover 21 on a straight line in the y-axis direction. In this case, the coupling force between the light guide panel 15 and the first side cover 21 through the first hole 41 and the protrusion 30 of the light guide panel 15, and the coupling force between the first and second side covers 21 and 22 through the second and third holes 42 and 43 and the first fixing member 51 improve fixing efficiency of the first and second side covers 21 and 22. The positions of the first through third holes 41, 42, and 43, and the protrusions 30 are limited thereto, provided that coupling force is applied between the light guide panel 15 and the side cover 20. That is, holes such as the second and third holes 42 and 43 may be respectively disposed in the side surfaces where the first and second side covers 21 and 22 overlap such that a fixing member is inserted into the holes in the y-axis direction.

The first and second side covers 21 and 22 may be respectively provided with a fourth hole 44 and a fifth hole 45 through which a second fixing member 52 (refer to FIG. 10) fixing the optical assembly 10 to the bottom cover 110 passes.

Substantially, the rest of the optical assembly 10 except for the second part 15a of the light guide panel 15 is the first area A that does not provide light to the display panel 210. The width of the first area A may be decreased according to the arrangement of the first through third holes 41, 42, and 43.

For example, the width of the first area A in the case where the second and third holes 42 and 43 are disposed between the LEDs 11 may be less than the width of the first area A in the case where the second and third holes 42 and 43 are disposed behind the LEDs 11.

The shapes of the first through third holes 41, 42, and 43 disposed in the side cover 20 of the optical assembly 10 are varied within the scope of the present disclosure.

The first fixing member 51 may be a screw or a fixing pin, but is not limited thereto.

When the first fixing member 51 is a screw, threads are provided to the inner surfaces of the second and third holes 42 and 43. Thus, the first fixing member 51 is screwed into the second and third holes 42 and 43 to tighten and fix the light guide panel 15 and the light source 13 interposed therebetween.

To secure the pitch of threads provided to the second and third holes 42 and 43, the thicknesses of portions of the first and side covers 21 and 22 around the second and third holes 42 and 43 may be greater than the thicknesses of the rest of the first and side covers 21 and 22, or a discrete member may be provided around the second and third holes 42 and 43.

The bottom cover 110 may have a box shape with an open upper surface to receive the backlight unit 100.

Figure 9:
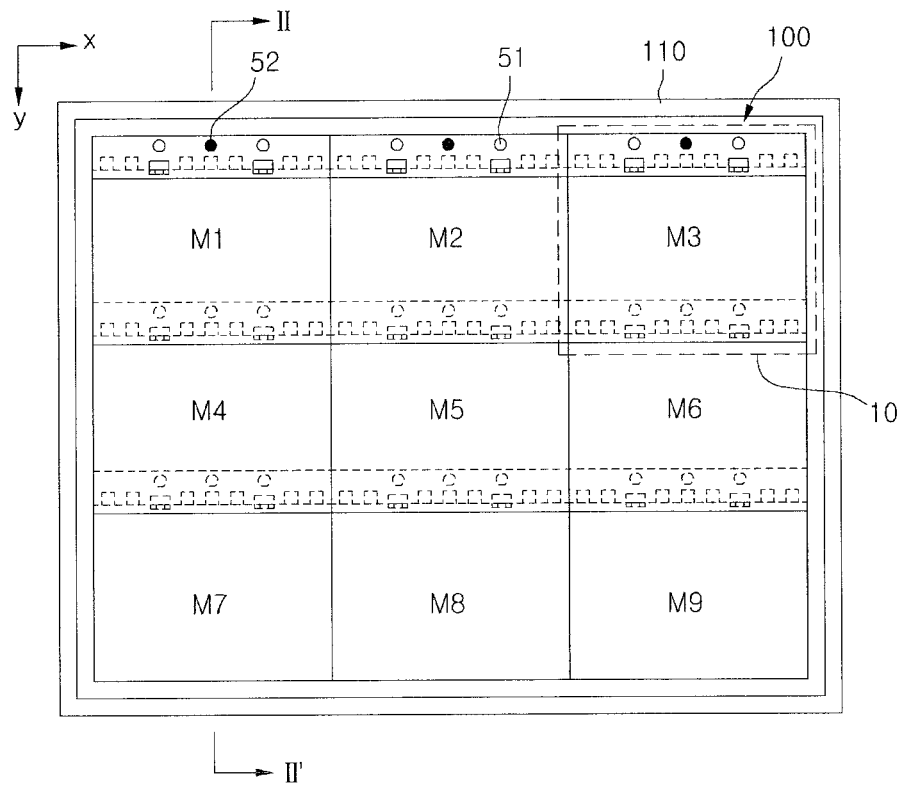
FIG. 9 is a diagram showing a backlight unit in a bottom cover.
Figure 10:
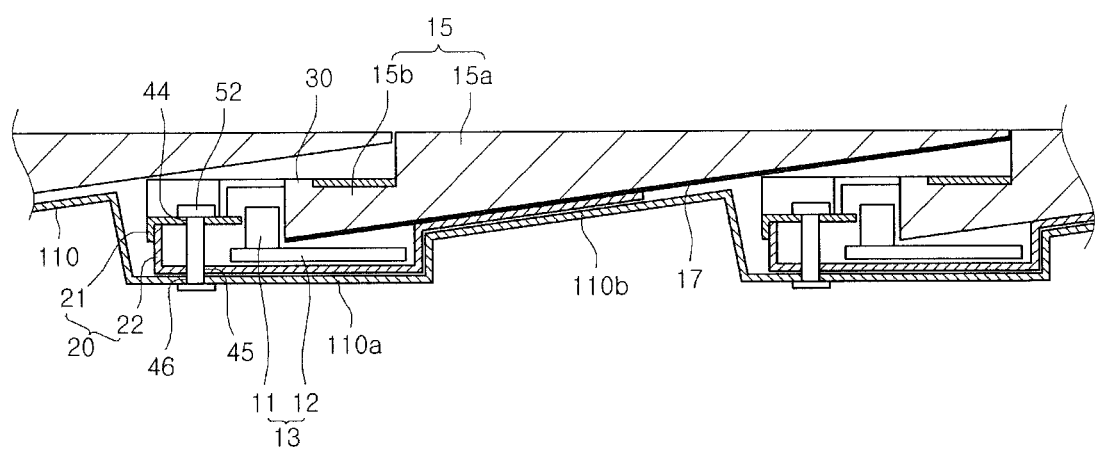
FIG. 10 is a diagram showing a cross-sectional view taken along section line II-II' of FIG. 9.
Figure 11:
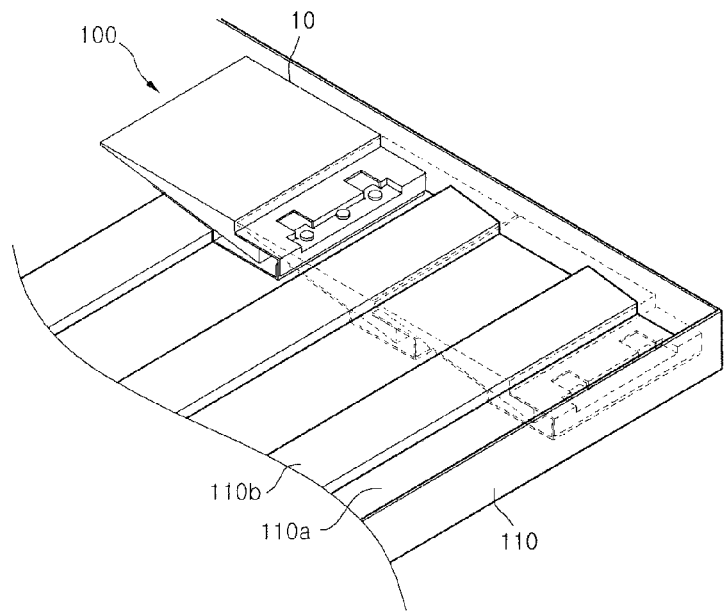
FIG. 11 is a diagram showing an optical assembly for a backlight unit in accordance with one or more of the aforementioned embodiments.

FIG. 9 is a plan view illustrating the backlight unit 100 in the bottom cover 110. FIG. 10 is a cross-sectional view taken along line _____' of FIG. 9. FIG. 11 is a perspective view illustrating the optical assembly 10 provided to the backlight unit 100.

In FIGS. 9 to 11, a description of the same part as those described with reference to FIGS. 1 to 8 will be omitted.

Referring to FIG. 9, the backlight unit 100 is disposed in the bottom cover 110 having an open top.

The bottom cover 110 may be formed of metal or plastic.

The backlight unit 100 is conveniently coupled with the optical assembly 10 by vertically inserting the optical assembly 10 into the bottom cover 110.

The optical assemblies 10 disposed on the bottom surface in the bottom cover 110 are caught to the bottom cover 110 through the second fixing member 52, so that the optical assemblies 10 can be fixed in place.

The second fixing member 52 may be coupled to the optical assembly 10 and the bottom cover 110 through the fourth hole 44 provided the first side cover 21 of the optical assembly 10, the fifth hole 45 corresponding to the fourth hole 44 and disposed in the second side cover 22, and a sixth hole 46 disposed in the bottom surface of the bottom cover 110 and corresponding to the fourth and fifth holes 44 and 45.

Each of the optical assemblies 10 may be provided with at least one couple of the fourth and fifth holes 44 and 45.

The second fixing member 52 may couple the optical assembly 10 to the bottom cover 110 in the coupling manner of the first fixing member 51 as described above, but the present disclosure is not limited thereto.

Even when the fourth and fifth holes 44 and 45 are removed from the side cover 20, the first fixing member 51 may be coupled to the sixth hole 46 of the bottom cover 110 to fix the optical assembly 10 to the bottom cover 110.

The side cover 20 may be provided with a hole through which a cable connecting the light source 13 to a control unit such as a main controller passes.

Referring to FIGS. 10 and 11, the backlight unit 100 is disposed on the bottom surface of the bottom cover 110, and each of the optical assemblies 10 is fixed to the bottom cover 110 through the second fixing member 52.

The optical assembly 10 has a flat upper surface and an inclined lower surface, which conform with the shape of the light guide panel 15. The bottom surface of the bottom cover 110, on which the optical assembly 10 is placed, may have a concave-convex structure conforming with the lower surface of the optical assembly 10.

For example, a structure including the light source 13, the first part 15b of the light guide panel 15, and the side cover 20 may be disposed on a concave part 110a of the concave-convex structure, and the second part 15a of the light guide panel 15 may be disposed on a convex part 110b of the concave-convex structure. The concave part 110a and the convex part 110b may be disposed alternately and repeatedly.

The bottom cover 110 may be formed using a press molding method or an extrusion molding method.

The shapes of the concave part 110a and the convex part 110b depend on the size and appearance of the optical assembly 10, so as to receive the optical assembly 10 and maintain the inclined angle of the lower surface of the light guide panel 15.

The bottom cover 110, having the bottom surface including the concave-convex structure according to the embodiment, may be adapted to maintain its shape and rigidity.

Figure 12:
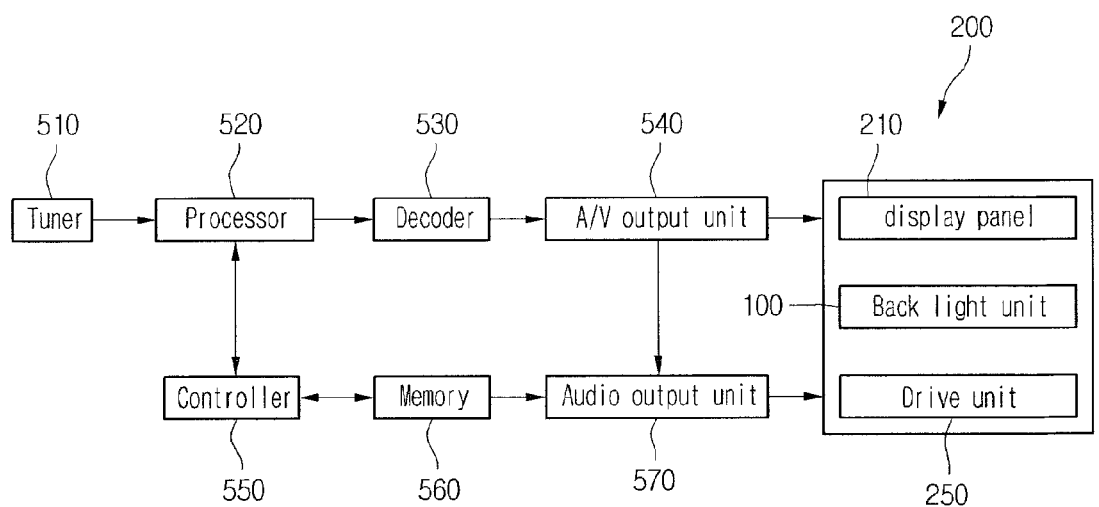
FIG. 12 shows controlling elements for a display apparatus according to an embodiment.

FIG. 12 shows operating elements for a display apparatus according to an embodiment.

Referring to FIG. 12, the display apparatus 1 includes the display module 200, a tuner 510, a processor 520, a decoder 530, an A/V output unit 540, a controller 550, a memory 560, and an audio output unit 570.

A broadcast data stream is transmitted from the tuner 510 through the processor 520, the decoder 530, and the A/V output unit 540 to the display module 200, and is displayed.

An operation of the tuner 510 or the processor 520 may be controlled by the controller 550 that may include the memory 560.

When the display apparatus 1 configured as described above is operated to select an arbitrary channel, the controller 550 controls the tuner 510 and the processor 520 to select the channel, and the processor 520 divides a data stream of a broadcast program, provided through the channel, into an audio data and a video data, and outputs them.

Then, the decoder 530 decodes the audio data and the video data output from the processor 520 into an audio signal and a video signal, so that the audio signal and the video signal can be output through the AN output unit 540 to the display module 200 or the audio output unit 570 such as a speaker unit.

A driving unit 250 drives the backlight unit 100 to display the output video signal on the display panel 210.

A broadcast data stream transmitted to the processor 520 may be provided through the Internet.

Figure 13:
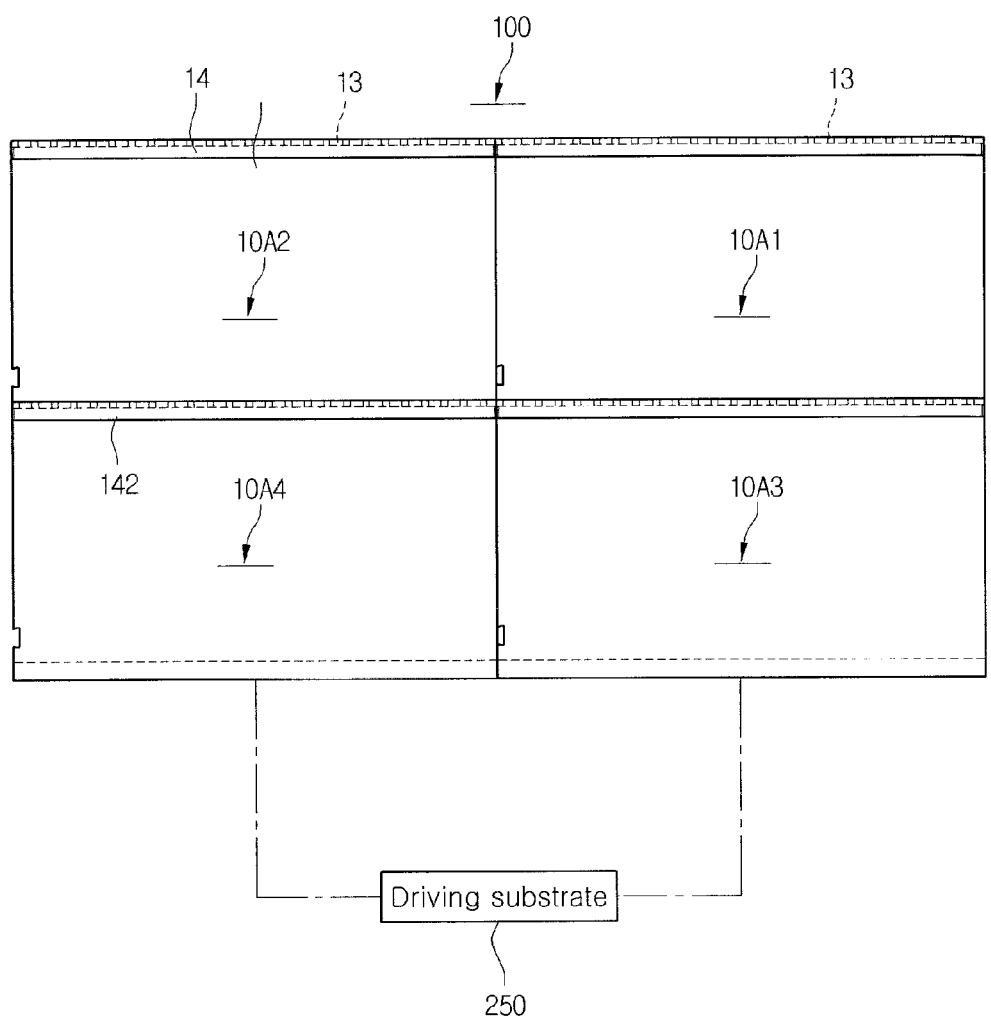
FIG. 13 shows controlling elements for a back light unit according to an embodiment.

FIG. 13 shows operating elements for a back light unit according to an embodiment.

Referring to FIG. 13, a plurality of optical assemblies 10A1, 10A2, 10A3, 10A4, each of which includes the light guide panel 15 and the reflecting member 17, are arrayed to form the backlight unit 100.

That is, the circuit substrates 14 and the light sources 13 are disposed on one side or two sides of the light guide panel, and the optical assemblies 10A1, 10A2, 10A3, 10A4 including the light guide panels 15 and the reflecting members 17 are arrayed on the light guide parts 110, so as to constitute the backlight unit 100.

The backlight unit 100 fabricated by coupling the optical assemblies 10A1, 10A2, 10A3, 10A4 as described above, or the light sources 13 connected to the backlight unit 100 may be independently or divisionally driven in group units by the driving substrate 250, thus significantly reducing power consumption of the backlight unit 100.

In this case, the division driving may be set and performed in module units, in light source units of the light sources 13, or in light source set units that are logically grouped.

That is, the light sources 13 may be grouped into primary light source groups that constitute sides respectively of modules, so that the light sources 13 can be driven in primary group units. Alternatively, the light sources 13 may be grouped into sub groups of the light sources 13 that constitute sides respectively of modules, so that the light sources 13 can be driven in sub group units.

As described above, according to the current embodiment, the light guide panels 15 are minimized, and the light sources 13 are continuously attached to the side surfaces of the light guide panels 15, thus securing a predetermined amount of light and dissipating heat. Specifically, the light sources 13 attached to the side surfaces of the light guide panels 15 are optically hidden.

According to the embodiment of FIG. 1, the small light guide panels are continuously attached to each other in light guide module manner to constitute the entire area of the display. Thus, the light sources can be disposed between the light guide panels, and the identical light guide panels can be used regardless of the size of the display.

The light guide panels are provided in module form, and continuously attached in tile manner, so as to form a large screen. Thus, identical parts can be applied to various sizes of televisions by varying the number thereof, so that the parts can be standardized.

Figure 14:
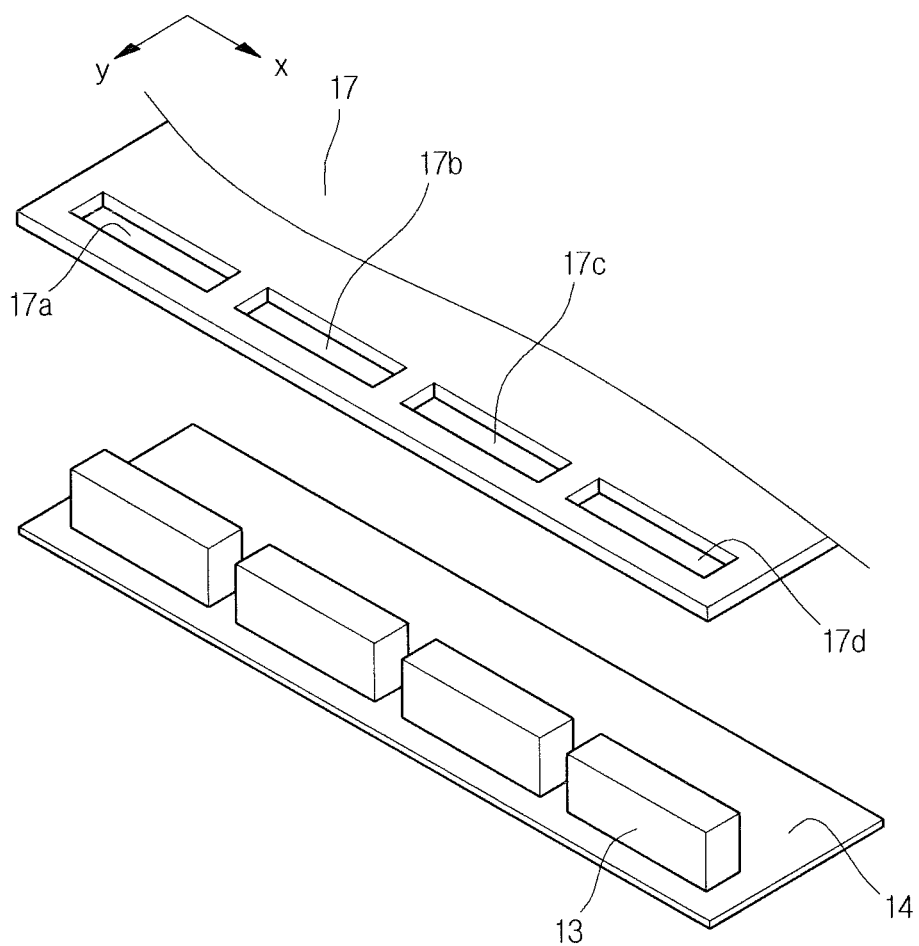
FIG. 14 is a perspective view illustrating a reflecting element and a substrate according to an embodiment.

FIG. 14 is a perspective view illustrating a reflecting element and a substrate according to an embodiment.

Referring to FIG. 14, at least one portion of the reflecting member 17 of the optical assembly 10 is placed on the substrate 14. The portion of the reflecting member 17 placed on the substrate 14 is provided with holes 17a, 17b, 17c, and 17d through which the light sources 13 arrayed on the substrate 14 pass.

In more detail, the holes 17a, 17b, 17c, and 17d have shapes and sizes corresponding to the light sources 13, and disposed at positions corresponding to the light sources 13.

Thus, when assembling the optical assembly 10, the light sources 13 are inserted into the holes 17a, 17b, 17c, and 17d of the reflecting member 17, so that the position of the reflecting member 17 relative to the substrate 14 can be fixed.

Figure 15:
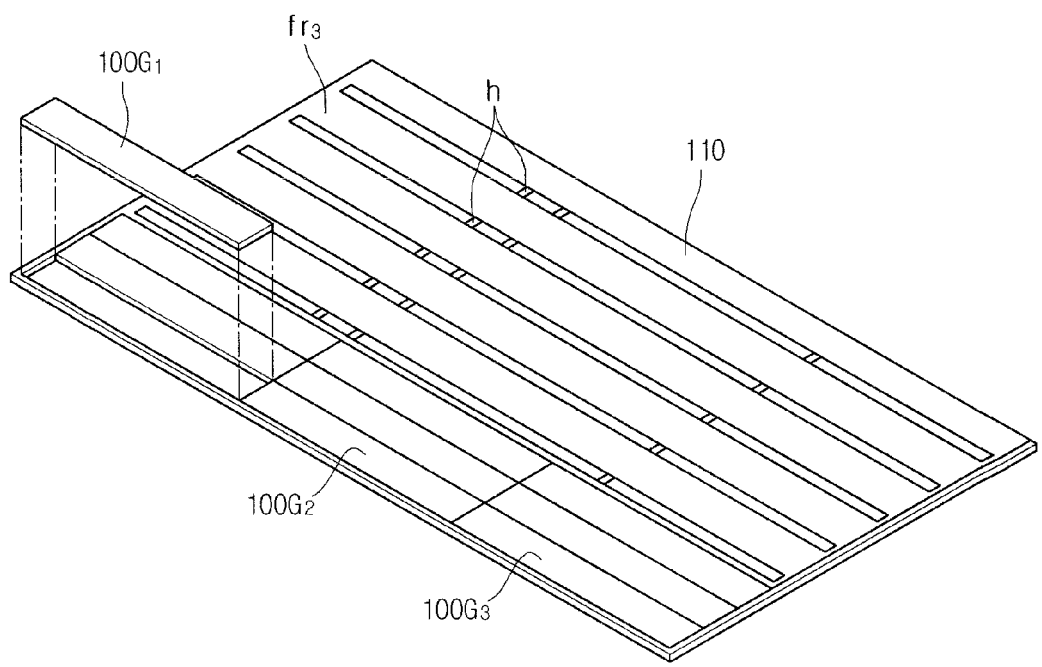
FIG. 15 is a perspective view illustrating a backlight unit according to an embodiment.
Figure 16:
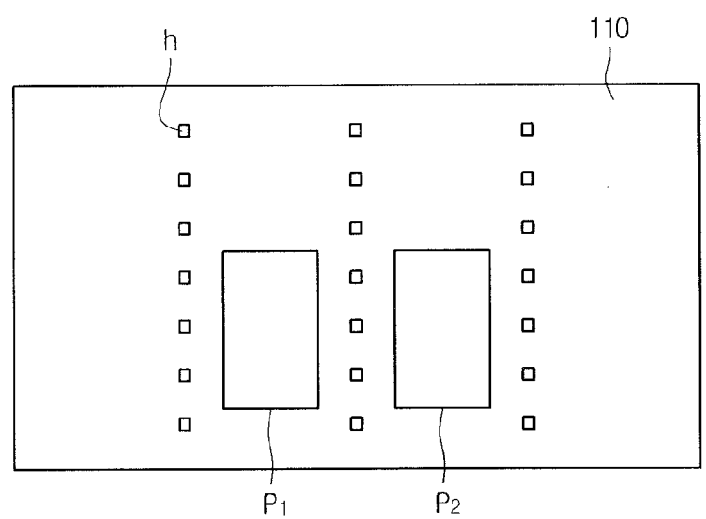
FIG. 16 is a plan view of a rear surface of a bottom cover of FIG. 15.

FIG. 15 is a perspective view illustrating a backlight unit according to an embodiment, and FIG. 16 is a plan view of a rear surface of a bottom cover of FIG. 15.

The current embodiment is the same as the embodiment of FIG. 1 except for a bottom cover and an optical assembly, which will be described in detail.

Referring to FIGS. 15 and 16, a plurality of optical assemblies 100G1, 100G2, and 100G3 are arrayed in three lines on the bottom cover 110 of the backlight unit 100. A plurality of holes h are disposed in the bottom cover 110 to connect connection parts 148 provided to the rear surfaces of the substrates 14 respectively of the optical assemblies 100G1, 100G2, and 100G3 to driving substrates P1 and P2 provided to the rear surface of the bottom cover 110.

In more detail, the optical assemblies 100G1, 100G2, and 100G3 are arrayed in one to three lines on the bottom cover 110. The connection parts 148 of the substrates 14 may be directly disposed on the bottom cover 110 in correspondence with the line or the lines, or the holes h for connecting the connection parts 148 to the driving substrates P1 and P2 may be disposed in the bottom cover 110 in correspondence with the line or the lines.

The driving substrates P1 and P2 are provided to the rear surface of the bottom cover 110, and may be referred to as a first driving substrate and a second substrate, respectively.

The first driving substrate P1 is disposed between neighboring first and second lines of the three lines, and the second driving substrate P2 is disposed between neighboring second and third lines of the three lines.

Hereinafter, a configuration of the substrate 14 of the optical assembly 10 will now be described in detail.

Figure 17:
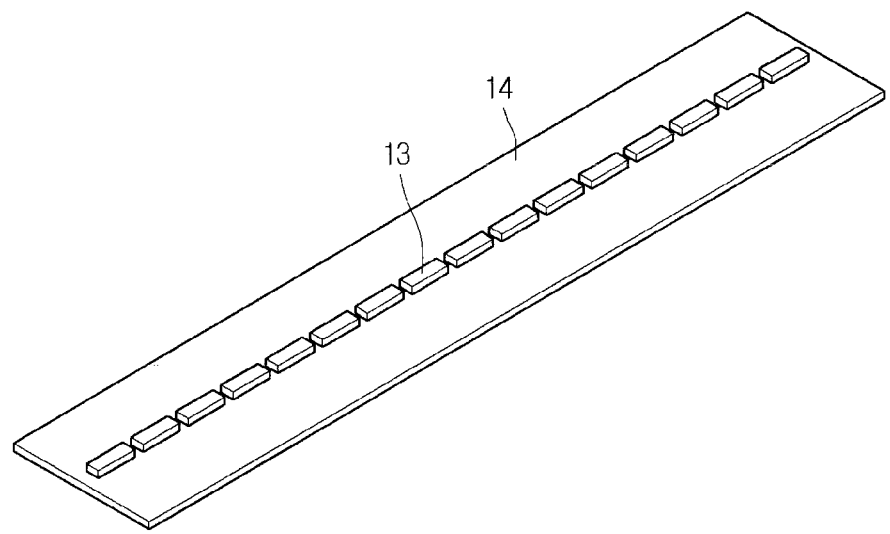
FIG. 17 is a perspective view of a substrate according to an embodiment.
Figure 18:
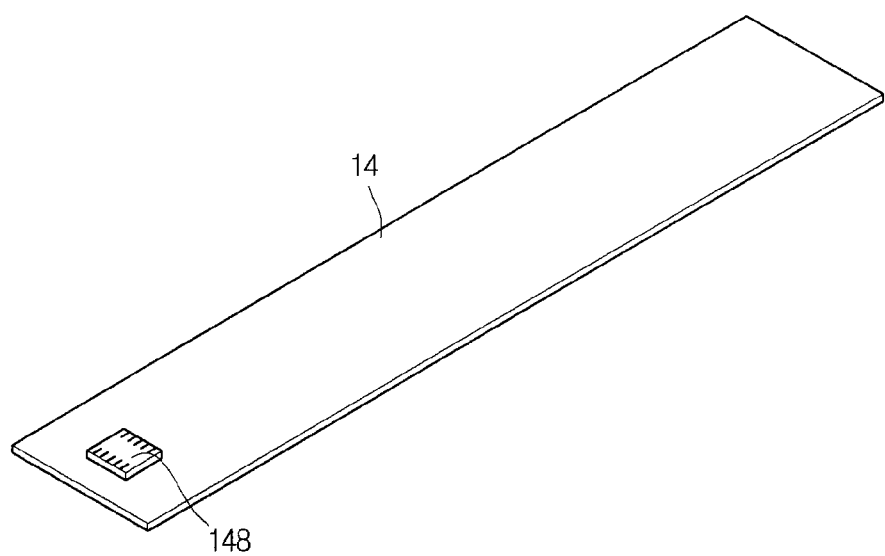
FIG. 18 is a perspective view of a rear surface of the substrate of FIG. 17.

FIG. 17 is a perspective view of a substrate of an optical unit of FIG. 15, and FIG. 18 is a perspective view of a rear surface of the substrate of FIG. 17.

Referring to FIGS. 17 and 18, the light sources 13 are disposed on a surface of the substrate 14, and the connection part 148 is disposed on an inner surface of the substrate 14 facing the bottom cover 110.

The connection part 148 is connected with a cable member (not shown) for transmitting a control signal from the driving substrates P1 and P2, and protrudes from the inner surface of the substrate 14 to the bottom cover 110.

The connection part 148 may directly pass through the hole h provided to the bottom cover 110.

The cable member has a side connected to the connection part 148, and another side connected to the driving substrates P1 and P2, to transmit the control signal of the driving substrates P1 and P2 through the connection part 148 to the substrate 14 and the light sources 13.

Figure 19:
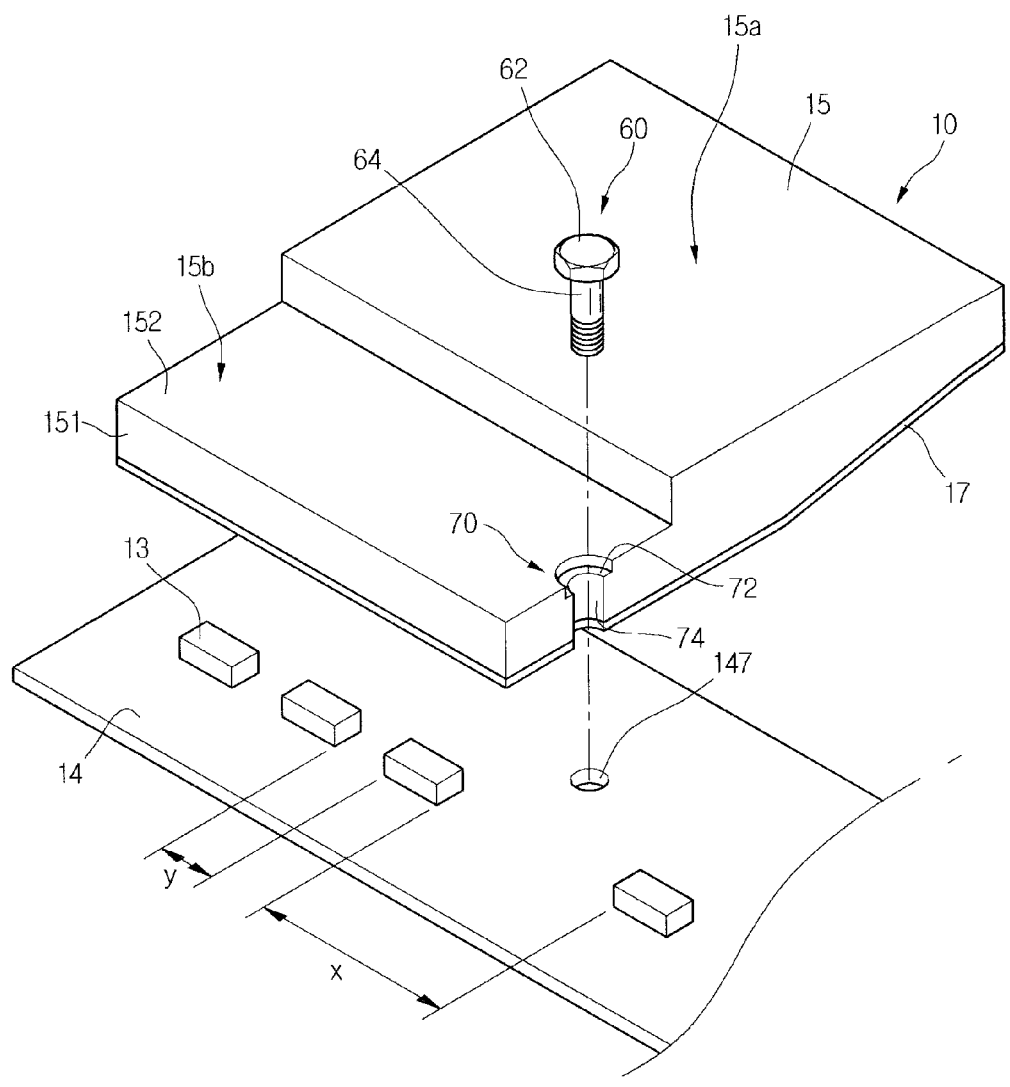
FIG. 19 is an exploded perspective view of an optical assembly according to an embodiment.
Figure 20:
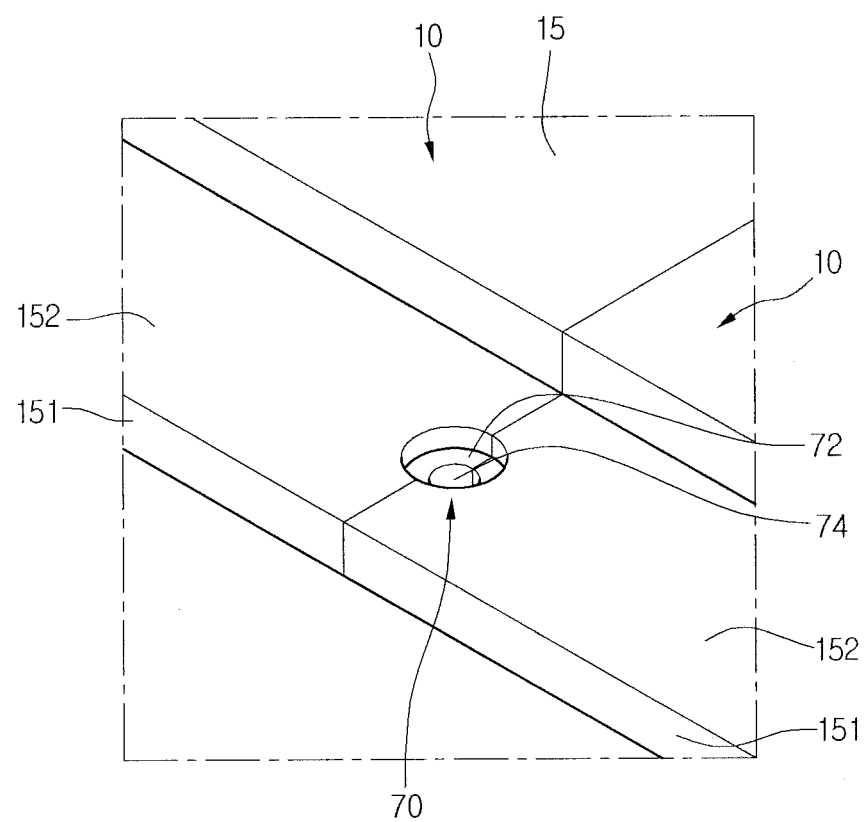
FIG. 20 is a perspective view of two light guide panels that are aligned of FIG. 19.

FIG. 19 is an exploded perspective view of an optical assembly according to an embodiment, and FIG. 20 is a perspective view of two light guide panels that are aligned of FIG. 16.

The current embodiment is the same as the embodiment of FIG. 1 except for a fixing structure of a light guide panel, which will now be described in detail.

Referring to FIGS. 19 and 20, the light incident part 15b of the light guide panel 15 of the optical assembly 10 is provided with a fixing part 70 where a fixing member 60, for fixing the light guide panel 15 to the substrate 14 or the bottom cover 110, is disposed.

The fixing part 70 of one of the adjacent light guide panels 15 is in contact with the fixing part 70 of the other to have a shape corresponding to the entire shape of the fixing member 60.

The fixing part 70 includes a recess part 72 that is disposed in the upper surface 152 of the light incident part 15b, and a through part 74 that passes through the lower side of the recess part 72. The recess part 72 is recessed with a diameter and a thickness corresponding to a head part 62 of the fixing member 60. A fixing member body 64 of the fixing member 60 having a spiral is inserted and fixed to the through part 74.

The substrate 14 is provided with a fixing hole 147 that is disposed at a position corresponding to the through part 74 to fix at least one portion of the fixing member body 64 passing through the through part 74. A distance x between the light sources 13 at a portion where the fixing hole 147 is disposed is greater than a distance y between the light sources 13 at a portion without the fixing hole 147 to prevent optical interference due to the fixing member 60.

Thus, when the light guide panels 15 of the backlight unit 100 are adjacent to each other, the fixing member body 64 passes through the through part 74 and is fixed to the substrate 14 or the bottom cover 110, and the head part 62 provided to the side of the fixing member body 64 compresses the recess part 72 to the substrate 14 or the bottom cover 110, thus fixing the light guide panels 15 to the substrate 14 or the bottom cover 110.

Although the configurations according to the aforementioned embodiments are provided independently, they may be combined to each other.

As the size of a display panel is increased, the size of a backlight unit providing light to a display panel is increased. In this case, according to the embodiment, a discrete structure or member is not required around a bottom cover to maintain the shape of the bottom cover. Thus, assembling of a backlight unit and a display module can be facilitated and simplified. Furthermore, the weight of a display module and the size of a bezel can be reduced.

According to the embodiments, the module-type backlight unit including the optical assemblies and provided to the display panel is adapted for the local driving method such as the local dimming method and the impulsive method. Thus, the display module according to the embodiment can have a high color contrast ratio and sharply express a bright portion and a dark portion on the screen, thus improving image quality.

Since the local driving method is used according to the embodiment, power consumption is reduced to achieve cost reduction.

The embodiments described herein, therefore, provide a module-type optical assembly, a backlight unit including a plurality of optical assemblies, and a display apparatus that receives light emitted from a backlight unit to display an image.

In one embodiment, an optical assembly includes a substrate; a plurality of light sources on the substrate, the light sources emitting light with a predetermined orientation angle with respect to a first direction; a light guide panel including: a light incident part having a light incident surface to which streaks of light respectively emitted from the light sources are laterally incident; and a light emitting part emitting the incident streaks of light upward and having a side adjacent and connected to the light incident part; and a cover covering the light sources disposed on the substrate and at least one portion of the light guide panel.

In another embodiment, a backlight unit includes a bottom cover; and N (N is 2 or greater) optical assemblies fixed to the bottom cover, wherein the optical assembly includes: a substrate; a plurality of light sources on the substrate, the light sources emitting light with a predetermined orientation angle; a light guide panel including: a light incident part having a light incident surface to which streaks of light respectively emitted from the light sources are laterally incident; and a light emitting part emitting the incident streaks of light upward and having a side adjacent and connected to the light incident part; and a cover covering the light sources disposed on the substrate and at least one portion of the light guide panel.

In further another embodiment, a display apparatus includes a display panel; a backlight unit on a rear side of the display panel, the backlight unit being divided into a plurality of blocks that are independently drivable; and a driving part on a rear side of the backlight unit, the driving part driving at least one of the display panel and the backlight unit, wherein the backlight unit includes: a bottom cover; and N (N is 2 or greater) optical assemblies fixed to the bottom cover, wherein the optical assembly includes: a substrate; a plurality of light sources on the substrate, the light sources emitting light with a predetermined orientation angle; a light guide panel including: a light incident part having a light incident surface to which streaks of light respectively emitted from the light sources are laterally incident; and a light emitting part emitting the incident streaks of light upward and having a side adjacent and connected to the light incident part; and a cover covering the light sources disposed on the substrate and at least one portion of the light guide panel.

In addition, a process of assembling the light source, the light guide panel, and the reflecting member is simple to constitute the optical assembly of the backlight unit. The process of assembling the optical assemblies to manufacture the backlight unit is simple, and losses generated during the assembling process are minimized, thus improving productivity. Furthermore, the light guide panel can be prevented from being scratched while the backlight unit is assembled, and optical mura can be prevented, thereby improving process reliability and the quality of the backlight unit.

In addition, the optical assemblies are standardized to be adapted for mass production and applied to backlight units having various sizes.

In addition, when one of the optical assemblies is damaged, only the damaged optical assembly can be replaced without replacing the backlight unit. Thus, a replacing process is convenient, and a replacing cost is reduced.

In addition, the optical assemblies and the backlight unit including the optical assemblies are resistant to external shock or environmental changes and have high durability.

In addition, since the adjacent optical assemblies overlap each other, a bright line or a dark line generated at the boundary of the optical assemblies is prevented to improve the uniformity of light. In addition, the backlight unit can be easily applied to a large display panel, and the slimness of the backlight unit and the display apparatus can be achieved. An optical assembly comprises: a light guide panel having a light incident section to receive light from a first direction and a light emitting section adjacent to the light incident section to emit light received from the light incident section in a second direction, the first and second directions being different directions; a plurality of light sources, the incident section of the light guide panel being adjacent to at least one light source to receive light output; and a first cover covering at least one light source and a portion of the light guide panel.

A backlight unit comprises: a bottom plate; and N (N is 2 or greater) optical assemblies adjacent the bottom plate, wherein at least one optical assembly includes a light guide panel having a light incident section to receive light from a first direction and a light emitting section adjacent to the light incident section to emit light received from the light incident section in a second direction, the first and second directions being different directions; and a plurality of light sources, the incident section of the light guide panel being adjacent to the light sources to receive light output; and a cover covering the at least one light source and a portion of the at least one light guide panel, wherein the cover is located between the at least one light source and a light emitting section of a light guide panel of an adjacent optical assembly.

A display apparatus having the above backlight unit, wherein the display apparatus further includes: a display panel; and a driving circuit, the backlight unit provided between the display panel and the driving circuit, wherein the plurality of optical assemblies are divided into a plurality of division areas, wherein at least one optical assembly in at least one division driving area emit light independently from at least one optical assembly in at least one other division area such that a brightness of the at least one division area is different from brightness of the at least one other division driving area.

The present disclosure also provides a "green" technology for display devices. Presently, the backlight is generally turned on continuously, even when the display of the entire screen is not desirable. For example, the prior art display allows control of the resolution of the entire display screen but not the size of the display screen. However, in certain instances, a smaller screen area may be desirable for lower resolution images. The size of the display area can be controlled based on the present disclosure. For example, instead of viewing images and programs in 42 inch display, the display screen size can be reduce to 32 inches by turning off the light sources for appropriate number of light guide plates located at the periphery of the display device. As can be appreciated, the location and size of the display area can be controlled based on program or user needs. As can be appreciated, multiple configuration may be possible based on turning on or off the light sources for appropriate number of light guide plates (light guide panels or light guide modules or assemblies) based on application and user configuration.

This application is related to Korean Applications Nos. 10-2008-0049146 filed on May 27, 2008, 10-2008-0061487 filed on Jun. 27, 2008, 10-2008-0099569 filed on Oct. 10, 2008, 10-2009-0035029 filed on Apr. 22, 2009, 10-2009-0036472 filed Apr. 27, 2009, 10-2009-0052805 filed on Jun. 15, 2009, 10-2009-0071111 filed Aug. 2, 2009, 10-2009-0072449 filed Aug. 6, 2009, 10-2009-0075120 filed on Aug. 14, 2009, 10-2009-0080654 filed Aug. 28, 2009, 10-2009-0098844 filed on Oct. 16, 2009, and 10-2009-0098901 filed on Oct. 16, 2009, whose entire disclosures are incorporated herein by reference. Further, this application is related to U.S. Provisional Patent Application Nos. 61/229,854 filed on Jul. 30, 2009; 61/230,844 filed on Aug. 3, 2009; 61/233,890 filed on Aug. 14, 2009; and 61/237,841 filed on Aug. 28, 2009 and U.S. application Ser. No. 12/453,885 filed on May 22, 2009, Ser. No. 12/618,603 filed on Nov. 13, 2009, Ser. No. 12/632,694 filed on Dec. 7, 2009, and Ser. Nos. 12/727,966, 12/728,001, 12/728,065, 12/728,087, 12/728,111, and 12/728,131 all filed on Mar. 19, 2010, whose entire disclosures are incorporated herein by reference.

It will be apparent to those skilled in the art that various modifications and variations can be made in the present disclosure without departing from the spirit or scope of the present disclosure. Thus, it is intended that the present disclosure cover the modifications and variations of this present disclosure provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical assembly comprising:
a light guide panel having a light incident section to receive light from a first direction and a light emitting section adjacent to the light incident section to emit light received from the light incident section in a second direction, the first and second directions being different directions;
a plurality of light, emitting diodes (LEDs) provided adjacent to the incident section of the light guide panel; and
a first cover covering the plurality of LEDs and the light incident section of the light guide panel, wherein at least one protrusion is provided on the light incident section and protrudes in the second direction, and the first cover includes at least one recess having a shape complementary to the at least one protrusion to allow mating between the at least one recess and protrusion.

2. The optical assembly of claim 1, further comprising a second cover and a substrate, the substrate provided between the plurality of LEDs and the second cover.

3. The optical assembly of claim 1, wherein the light emitting section has a first surface that is at least substantially parallel to the first direction and a second surface, which is an opposite surface from the first surface, inclined at a predetermined angle relative to the first surface.

4. The optical assembly of claim 1, wherein the first cover comprises a first portion substantially parallel to the first direction and a second portion substantially parallel to the second direction.

5. The optical assembly of claim 3, further comprising a second cover, the second cover having an angle of inclination that is substantially same as the predetermined angle.

6. The optical assembly of claim 2, wherein the first cover includes a first opening and the second cover includes a second opening, the first and second openings are configured to be aligned to receive a fastener for fastening the first and second covers to the light guide panel.

7. The optical assembly of claim 2, further comprising a frame configured to receive the light guide panel, the first cover having a first opening, the second cover having a second opening and the frame having a third opening, the first, second and third opening configured to aligned with each other to receive a fastener.

8. The optical assembly of claim 7, wherein the fastener is a screw.

9. The optical assembly of claim 1, wherein a first portion of the light incident section closest to the plurality of LEDs having a first prescribed height, a first portion of the light emitting section closest to the light incident section in the first direction has a second prescribed height, and a second portion of the light emitting section farthest from the light incident section in the first direction has a third prescribed height, wherein at least one of the first prescribed height or the second prescribed height is different from the third prescribed height.

10. The optical assembly of claim 9, wherein the height decreases from the second prescribed height to the third prescribed height in the second direction.

11. The optical assembly of claim 9, wherein a height of the plurality of LEDs is less than or substantially equal to the first prescribed.

12. The optical assembly of claim 9, wherein a difference between the first and second prescribed heights is greater than or substantially equal to the third prescribed height.

13. The optical assembly of claim 12, wherein the difference in the first and second prescribed heights corresponds to an elevation difference between a top surface of the light incident section and a top surface of the light emitting section.

14. The optical assembly of claim 1, further comprising a reflecting member to reflect the light received in the first direction by the light emitting section to the second direction.

15. The optical assembly of claim 1, wherein the plurality of LEDs comprises a first group of LEDs separate from each other by a first prescribed distance and a second group of LEDs separated from each other by a second prescribed distance, which is different from the first prescribed distance.

16. The optical assembly of claim 15, wherein the second group of LEDs comprises adjacent LEDs where the at least one protrusion is provided between a span of the second prescribed distance, the second prescribed distance being greater than the first prescribed distance.

17. A lighting unit comprising:
a bottom plate; and
N (N is 2 or greater) optical assemblies adjacent the bottom plate,
wherein at least one optical assembly includes:
a light guide panel having a light incident section to receive light from a first direction and a light emitting section adjacent to the light incident section to emit light received from the light incident section in a second direction, the first and second directions being different directions; and
a plurality of light emitting diodes provided adjacent to the incident section of the light guide panel; and
a cover covering the plurality LEDs and the light incident section of the at least one light guide panel, wherein the cover is located between the plurality of LEDS and a light emitting section of a light guide panel of an adjacent optical assembly, wherein the plurality of LEDs comprises a first group of LEDs separate from each other by a first prescribed distance and a second group of LEDs separated from each other by a second prescribed distance, which is greater than the first prescribed distance.

18. The lighting unit of claim 17, wherein the cover includes a bottom cover having a first surface adjacent to the plurality of LEDs and a second surface adjacent to the light incident section of the light guide panel.

19. The lighting unit of claim 18, wherein the cover includes a top cover located between the plurality of LEDs and the light emitting section of the light guide panel of the adjacent optical assembly.

20. The lighting unit of claim 19, wherein the bottom cover of the optical assembly is supported by the bottom plate of the lighting unit.

21. The lighting unit of claim 18, wherein a portion of the light emitting section of the optical assembly overlaps an upper side of the light incident section of another optical assembly.

22. The lighting unit of claim 18, wherein the light emitting section comprises a portion that changes in thickness from a first point to a second point, the first point being closer to the light incident section that the second point.

23. A display apparatus having the lighting unit of claim 17, wherein the display apparatus further includes:
a display panel; and
a driving circuit, the lighting unit provided between the display panel and the driving circuit, wherein the plurality of optical assemblies are divided into a plurality of division areas, wherein at least one optical assembly in at least one division driving area emit light independently from at least one optical assembly in at least one other division area such that a brightness of the at least one division area is different from brightness of the at least one other division driving area.

* * * * *